United States Patent [19]

Kuhn

[11] Patent Number: 5,457,439
[45] Date of Patent: Oct. 10, 1995

[54] APPARATUS FOR DISPLAYING THE LEVEL OF DANGER OF THE INSTANTANEOUS DRIVING SITUATION OF A MOTOR VEHICLE

[75] Inventor: Friedemann Kuhn, Stuttgart, Germany

[73] Assignee: Mercedes-Benz AG, Germany

[21] Appl. No.: 246,168

[22] Filed: May 19, 1994

[30] Foreign Application Priority Data

May 28, 1993 [DE]  Germany ............................ 43 17 831.6

[51] Int. Cl.[6] ..................................................... B60Q 1/00
[52] U.S. Cl. .......................... 340/435; 340/479; 340/903
[58] Field of Search .................................. 340/435, 903, 340/936, 905, 467, 479, 464, 958, 436

[56] References Cited

U.S. PATENT DOCUMENTS

| | | | |
|---|---|---|---|
| 3,597,730 | 8/1971 | McClellan, Sr. et al. | 340/936 |
| 3,775,743 | 11/1973 | Carter | 340/905 |
| 4,059,824 | 11/1977 | Tanimura | 340/467 |
| 4,208,658 | 6/1980 | Fujiki et al. | 343/7 VM |
| 4,229,727 | 10/1980 | Gilhooley | 340/905 |
| 4,868,719 | 9/1989 | Kouchi et al. | 340/479 |
| 5,291,195 | 3/1994 | Gross | 340/958 |

FOREIGN PATENT DOCUMENTS

| | | |
|---|---|---|
| 59-84640A | 5/1984 | Japan . |
| 2253294 | 9/1992 | United Kingdom . |
| 8403383 | 8/1984 | WIPO ................................. 340/435 |

OTHER PUBLICATIONS

"Entwicklungslinien in Kraftsfahrzeugtechnik und Strassenverkehr", Research Report issued by Bundeminister für Forschungsbilanz und Technologie by Verlag TÜV Rheinland GmbH, Sep. 1978, pp. 559–566.

Primary Examiner—Brent Swarthout
Attorney, Agent, or Firm—Evenson, McKeown, Edwards & Lenahan

[57] ABSTRACT

A display arrangement for depicting the level of danger associated with current driving conditions of a motor vehicle. A control unit processes the vehicle's speed and its distance from the vehicle in front and presents a green circular area if the speed and the distance from the vehicle in front are in the permitted, instantaneously safe range. If the vehicle speed exceeds the permitted speed by a first limit amount, or if the distance from the vehicle in front becomes smaller than the distance which the vehicle covers within a first prescribed time period, the display changes gradually from the circular shape, to an elongated area with a shape which extends more horizontally than vertically, and the color of the area shown changes from green to yellow. If the permitted speed is exceeded by a second limit amount, or the distance from the vehicle in front becomes smaller than the distance which the vehicle covers within a second prescribed time period (for example, one second), the display changes to a symbol containing cognitively striking warning information and at the same time the color of the symbol shown changes from yellow to red.

24 Claims, 1 Drawing Sheet

APPARATUS FOR DISPLAYING THE LEVEL OF DANGER OF THE INSTANTANEOUS DRIVING SITUATION OF A MOTOR VEHICLE

BACKGROUND AND SUMMARY OF THE INVENTION

The invention relates to a display for informing the operator of a motor vehicle of the level of danger of the instantaneous driving situation.

As traffic density increases, collisions between vehicles following one behind the other occur more frequently as a result of vehicles following too closely or travelling at excessively high rates of speed if visibility is poor. This development highlights the need for a simple and reliable display of the level of danger of the driving situation of a vehicle. There is still a lack of display devices which are capable of providing displays in a way which is appropriate for the specific perception requirements in general traffic and which thus fulfills an essential basic requirement for a high level of acceptance in motorized traffic.

In fact, the technical paper "Autonomous Distance Warning Device in Fleet Trials", published in the journal Forschungsbilanz (Research Reports) 1978 issued by the Bundeminister für Forschung und Technologie (Federal Minister for Research and Technology) by Verlag TÜV Rheinland GmbH on development trends in motor vehicle technology and road traffic discloses a display which is integrated into the dashboard of a motor vehicle for displaying the level of danger of the instantaneous driving situation of a motor vehicle. The display in this case consists of a line of LEDs which are composed of a plurality of segments. The length of the segments which can be illuminated in different colors can be actuated in a variable fashion depending on the level of danger.

This display has the disadvantage that, for its continuous cognitive perception and observation, it excessively tires and distracts the driver of the vehicle. As a result, the driver's attention threshold for the rest of the surroundings and traffic events is significantly degraded.

Furthermore, an electronic parking aid referred to as the "Bosch Parking Pilot" is available which uses, inter alia, an alphanumeric digital display. Next to a distance indication, a simplified arrow symbol can be "intensified" based on the numerically displayed, currently remaining safety distance from an obstacle behind by arranging a greater or lesser number of arrow symbols in a unidimensional fashion. However, this display is incapable of displaying, either generally or gradually, a level of danger which takes into account the instantaneous speed at which the vehicle is travelling.

The object of the present invention is therefore to provide a display which shows the level of danger of the instantaneous driving situation of a vehicle, in a manner that is simple and reliable and takes the vehicle's speed into account.

This object is achieved according to the invention by means of a display which comprises a video screen and a control which processes at least the travelling speed and the distance between vehicles. The display presents a green circular area if the speed and the distance from the vehicle in front are in the permitted, instantaneously safe range. If the vehicle speed exceeds the permitted speed by a first limit amount (for example 5%), or if the distance from the vehicle in front becomes smaller than the distance which the vehicle covers within a first prescribed time period, (for example, two seconds), the display changes gradually from the circular shape, to an elongated area with a shape which extends more horizontally (that is, transversely with respect to the direction of travel) than vertically (that is, in the direction of travel), and the color of the area shown changes from green to yellow.

If the permitted speed is exceeded by a second limit amount (for example 19%), or the distance from the vehicle in front becomes smaller than the distance which the vehicle covers within a second prescribed time period (for example, one second), the display changes to a symbol containing cognitively striking warning information and at the same time the color of the symbol shown changes from yellow to red.

The display which is designed in this manner advantageously uses for the cognitive communication of its information the experience that a circular area is felt to be a positively harmonic shape which it is worth striving to preserve, whilst for example an area which extends horizontally, or has corners or completely covers a display field, is felt to be an impediment which should be avoided.

The advantage of such a display lies in the reduction of information, with simultaneous request for action. If the display changes for example the color of the symbol from green to yellow or from yellow to red, such change indicates to the driver of the vehicle that he should take his foot off the accelerator pedal (as at a traffic light), regardless of whether for example the permitted speed has just been exceeded or the distance from the vehicle in front has become too small.

According to the invention, the area which extends more horizontally than vertically can be substantially elliptical. Furthermore, the display control unit 11 can be constructed such that the degree of deformation (that is, the eccentricity, or the ratio of length to width) of the previously circular area, for example into such an ellipse, corresponds respectively to the degree by which the safe maximum speed is currently being exceeded or the degree by which the optimum, safe distance from the vehicle in front is reduced or undershot.

In addition, the display can also be designed so that, for example, the display of a yellow substantially elliptical area changes, if the second limit amount is exceeded, into for example an ellipse which has a maximum horizontal extent and a minimum vertical extent symbolizing a red danger sign for the driver of the vehicle.

Alternatively, the display of an elliptical area which is still shown as yellow can change to a red warning triangle or square, which may also fill the entire screen. In particular in the last two cases, the corresponding change of shape of the displayed signal can be sudden.

Another embodiment of the display according to the invention indicates the distance or degree of departure from the safety limit by causing the green circular area (indicating that the distance is greater than the safety distance and the vehicle is travelling more slowly than the maximum safe speed) to change its shape into an area which extends more vertically (in the direction of travel) than horizontally, for example into an elliptical area having a vertical major axis. In this manner, this area can also change its shape to a greater extent the greater the safety margin relative to the optimum safe driving situation. For example, the maximum deformation of such a vertical ellipse can correspond to that of the previously mentioned horizontal ellipse.

The signals required for the appropriate actuation of the display are acquired from wheel speed sensors and from sensors which detect the surroundings of the vehicle, for example from a distance-detection radar, an infrared visual range meter or a system which detects the instantaneous coefficient of friction between tire and road and continuously evaluates this information for example in a computer, and processes it to form actuation signals for the display.

At the same time, with available sensor systems, the display can be used to show all physical variables which influence the control of the longitudinal dynamics of the vehicle. For example, the display can derive what it displays as a function of instantaneous distance from the vehicle in front—safety distance; that is, the difference between the current rate of speed of the vehicle and speed limit/permitted speed visual range/permitted speed tire friction/permitted speed.

The individual influencing factors are logically linked with an OR operation. As soon as a component supplies a negative value, the display can change what it displays, for example from green to yellow or from the circular area to the ellipse, etc. If more than one influencing factor simultaneously supplies a negative value, the display determines what it displays according to the respectively most negative instantaneous value.

According to a further embodiment, at least the number of kilometers per hour at which the vehicle is instantaneously travelling can be depicted within the respectively indicated area.

Other objects, advantages and novel features of the present invention will become apparent from the following detailed description of the invention when considered in conjunction with the accompanying drawings.

DETAILED DESCRIPTION OF THE DRAWINGS

Figure 1:
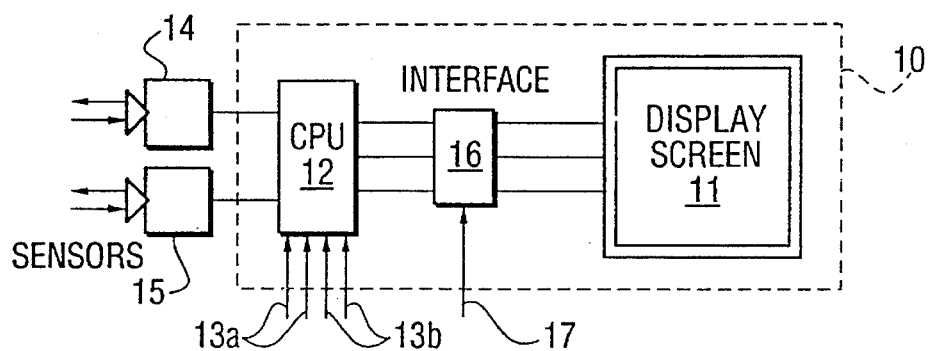
FIG. 1 shows a block circuit diagram of an exemplary embodiment of the display.

As shown in FIG. 1, the display 10 comprises a display screen 11 which can utilize any desired display technology, a safety computer 12 for evaluating driving data and discriminating them to form display and/or actuation signals and, if the screen is not actuated solely by the computer 12 itself, an actuation interface 16 between the computer 12 and the display 11.

The safety computer 12 is fed signals from a distance radar or Lidar 14 and a speed or wheel speed signal via inputs 13a and, optionally, speed limit data which are transmitted to the vehicle for example by means of radio, infrared light or an induction loop. Optionally, the computer 12 can also receive via further inputs 13b a signal from an infrared visual range measuring device 15 and/or a tire grip signal from a coefficient of friction detection device or other physical variables which influence the control of the longitudinal dynamics of the vehicle or reflect the driving situation.

Based on these inputs, the computer can derive actuation instructions, for example as a function of the difference between the instantaneous distance from the vehicle in front and the safety distance, or the difference between a speed which is permitted and the speed at which the vehicle is travelling, etc. For this purpose the computer respectively logically connects corresponding individual discriminations with OR operations.

As a result, it is ensured that any change in the discrimination of the driving situation which affects a maximum value selection changes the actuation instruction of the computer for the display. Thus, the most current instantaneous degree of danger is always displayed on the screen in real time. Of course, the computer 12 can also display, for example outside the respective current display symbol, other information on the screen 11 without departing from the invention. For example, symbols are conceivable here which categorize the type of obstacles which the distance radar detects for example in bends on the roadway.

Display drive interface 16 can also receive, for example via an input 17, a brightness signal from a passenger compartment brightness sensor or ambient brightness sensor in order to actuate the display 11 more or less strongly as a function of the brightness.

Figure 2:
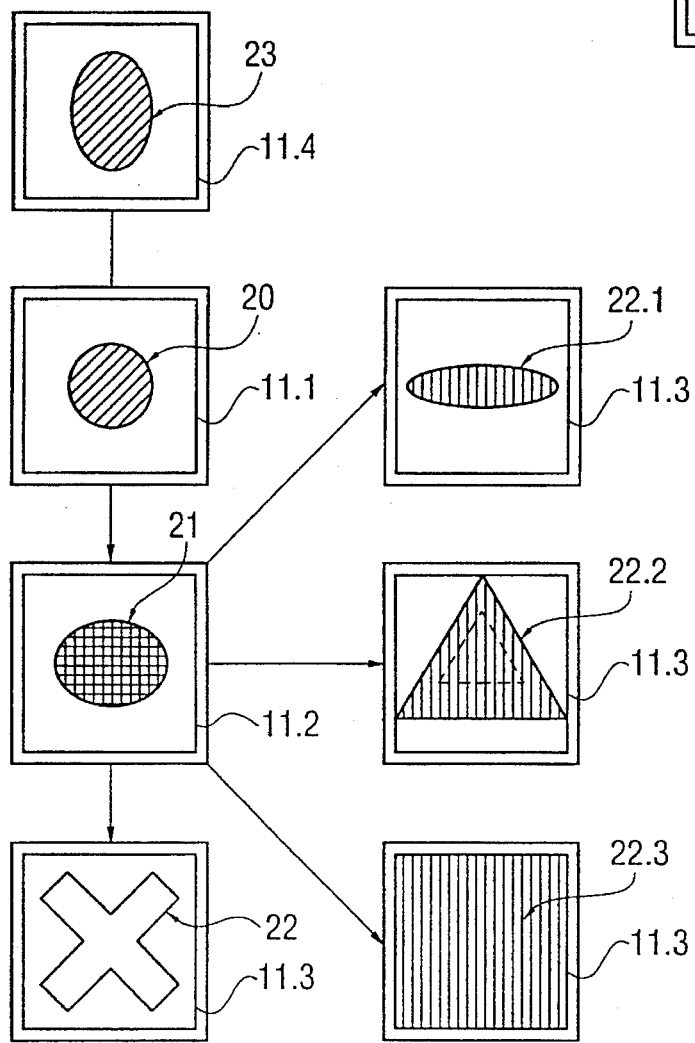
FIG. 2 is a diagrammatic illustration of what the display can display as a function of different safe driving conditions.

FIG. 2 illustrates, by way of example, the display possibilities on the screen 11 which are assigned to various driving situations.

If the vehicle is at an optimum and safe distance from the vehicle in front, the computer 12 actuates the screen 11.1 in such a way that the most striking item of information it shows is a green circular area 20. If the vehicle speed exceeds a permitted limit by a first amount (for example 5%,), or if the distance from the vehicle in front becomes smaller than that which the vehicle covers within a prescribed first time period (for example, two seconds), the computer 12 actuates the screen 11.2 such that the circular area changes into the area 21—for example with a substantially elliptical shape—which extends more horizontally than vertically, and at the same time the color changes from green to yellow.

If the speed exceeds an acceptable maximum speed by a second limit amount (for example 20%), or if .the distance from the vehicle in front becomes less than the distance which the vehicle covers within a prescribed second time period (for example, one second), the computer 12 actuates the screen 11.3 which shows a symbol 22 containing striking cognitive warning information and, at the same time, the color of the displayed symbol changes from yellow to red.

The symbol 22 on the screen 11.3 can be for example a highly eccentric ellipse 22.1 which extends horizontally to a particularly large degree and represents a danger sign, a warning triangle 22.2 or a rectangular area 22.3 which fills the screen 11.3 to a greater or lesser extent and represents a no-go area. The latter symbols, as mentioned, are of a red color which is relatively strong or bright. Such a no-go area which appears in particular in a signalling color can also completely fill or cover the screen 11.3.

If the distance from the vehicle in front is greater than the safety distance or if the vehicle is travelling at or below an acceptable maximum safe speed, the computer 12 can also actuate the screen 11.4 to display an area 23, for example with an ellipsoidal shape, which extends more vertically (or in the direction of travel) than horizontally without a change in color. In this case, the vertical extent of the ellipsoidal shape reflects the margin of safety between vehicle speed and distance, and the maximum limits. At the same time, the area 23 which is changed in shape to a maximum degree can correspond for example to the red horizontal ellipse 22.1, that it is rotated by 90°.

Figure 3:
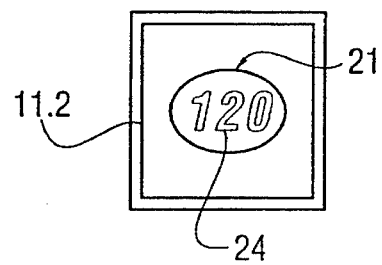
FIG. 3 shows a diagrammatic illustration of the additional display of the instantaneous speed.

According to FIG. 3, the computer 12 and interface 16 can actuate the screen 11 to display at least the instantaneous speed of the vehicle superimposed on at least one of the planar symbols such as circle 20 or ellipse 21. If required, the screen 11 can also be actuated to display further legible information or symbols, for example, categorizing the type of obstacles or fixed objects which the distance radar detects if changing lanes or cornering.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Display arrangement for indicating to an operator of a motor vehicle an instantaneous degree of danger of driving conditions, said motor vehicle having sensors for detecting speed of said vehicle and distance of said vehicle from a vehicle in front, said display arrangement comprising:

a visual display comprising a substantially planar screen for displaying two dimensional figures having continuously variable shape and color, said visual display screen being positioned in the vehicle and visible to said operator; and a control unit coupled to receive output signals from said speed and distance sensors and having logic circuitry for causing said visual display screen to display a two dimensional figure having predetermined arbitrary shape and color, and for continuously varying said shape and color to indicate vehicle driving conditions according to the following when said vehicle speed and said distance of said vehicle from a vehicle in front fall within respective first speed and distance limits which correspond to safe driving conditions, a circular figure having a first color is displayed as said two dimensional signal;

when said vehicle speed exceeds said first speed limit but is less than a second speed limit, or when said distance between said vehicle and said vehicle in front is less than said first distance limit but greater than a second distance limit, said display gradually changes said figure to an elongated shape having a major axis which is aligned with a first direction, and said shape changes from said first color to a second color; and if said vehicle speed exceeds said second speed limit or said distance to said vehicle in front is less than said second distance limit, said display changes said visual signal to a third color, having a predetermined shape geometrically different from said elongated shape, and easily distinguishable therefrom.

2. Display arrangement according to claim 1 wherein when said display changes to an elongated area having a major axis aligned in the first direction, the color of said elongated shape changes, and eccentricity of said elongated shape increases, as said vehicle speed increases or said distance to said vehicle in front decreases.

3. Display arrangement according to claim 1 wherein said elongated area is substantially elliptical.

4. Display arrangement according to claim 2 wherein said elongated area is substantially elliptical.

5. Display arrangement according to claim 1 wherein said eccentricity of said elongated shape increases steadily with increasing vehicle speed and with decreasing distance from said vehicle to said vehicle in front.

6. Display arrangement according to claim 1 wherein said eccentricity of said elongated shape increases nonlinearly with increasing vehicle speed and with decreasing distance from said vehicle to said vehicle in front.

7. Display arrangement according to claim 1 wherein said easily identifiable shape is an elongated area having a maximum eccentricity.

8. Display arrangement according to claim 7 wherein said elongated shape is an ellipse.

9. Display arrangement according to claim 1 wherein said easily identifiable shape is substantially triangular.

10. Display arrangement according to claim 1 wherein said easily identifiable shape is substantially rectangular.

11. Display arrangement according to claim 10 wherein said rectangular shape substantially completely fills a display screen of said visual display.

12. Display arrangement according to claim 1 wherein said control unit further causes said visual display to change said two dimensional visual signal according to the following:

when said vehicle speed and said distance of said vehicle from the vehicle in front is less than said first speed and distance limits by a predetermined margin of safety, said display changes said shape to an elongated area having a major axis aligned in a second direction perpendicular to said first direction.

13. Display arrangement according to claim 12 wherein when said display changes to an elongated area having a major axis aligned in said second direction, eccentricity of said elongated shape increases as said vehicle speed decreases or said distance to the vehicle in front increases.

14. Display arrangement according to claim 13 wherein said elongated shape is an ellipse.

15. Display arrangement according to claim 1 wherein said first direction is horizontal.

16. Display arrangement according to claim 12 wherein said first direction is horizontal and said second direction is vertical.

17. Display arrangement according to claim 1 wherein at least a numerical display of current vehicle speed is superimposed on said two dimensional visual signal.

18. Display arrangement according to claim 12 wherein at least a numerical display of current vehicle speed is superimposed on said two dimensional visual signal.

19. Display arrangement according to claim 1 wherein said vehicle display displays further information concerning operation of said vehicle in addition to said two dimensional visual signal.

20. Display arrangement according to claim 12 wherein said vehicle display displays further information concerning operation of said vehicle in addition to said two dimensional visual signal.

21. Display arrangement according to claim 19 wherein said further information concerns fixed objects detected in bends in a roadway.

22. Display arrangement according to claim 1 wherein said visual display presents at least one additional signal from one of an infrared visual range measuring system and a system for measuring a coefficient of friction between a tire of said vehicle and a road on which it is operated.

23. Display arrangement according to claim 1 wherein brightness of said visual display is responsive ambient brightness of a passenger compartment of said vehicle.

24. Display arrangement according to claim 1 further comprising:

means for receiving information from an external information source concerning speed limits applicable to a road on which said vehicle is operated; and means for processing said information;

said control unit being responsive to said processed information for generating said two dimensional signals.

* * * * *